United States Patent
Lee et al.

(10) Patent No.: US 10,601,817 B2
(45) Date of Patent: Mar. 24, 2020

(54) METHOD AND APPARATUS FOR PROVIDING SECURITIES TO ELECTRONIC DEVICES

(71) Applicant: HP PRINTING KOREA CO., LTD., Suwon-si, Gyeonggi-Do (KR)

(72) Inventors: Jae-yoon Lee, Seongnam-si (KR); Hyun-sook Rhee, Suwon-si (KR); Su-kyoung Chae, Seoul (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 151 days.

(21) Appl. No.: 15/422,904

(22) Filed: Feb. 2, 2017

(65) Prior Publication Data

US 2017/0223015 A1    Aug. 3, 2017

(30) Foreign Application Priority Data

Feb. 2, 2016 (KR) .................. 10-2016-0012895

(51) Int. Cl.
*H04L 29/06* (2006.01)
*H04L 9/32* (2006.01)
(Continued)

(52) U.S. Cl.
CPC ........ *H04L 63/0853* (2013.01); *H04L 9/0869* (2013.01); *H04L 9/0877* (2013.01);
(Continued)

(58) Field of Classification Search
CPC . H04L 63/0428; H04L 9/0863; H04L 9/0822; H04L 63/20; H04L 63/06; H04L 63/061; H04L 63/0853; H04L 63/08; H04L 63/04; H04L 63/0823; H04L 9/14; H04L 9/30; H04L 9/3234; H04L 9/0869;
(Continued)

(56) References Cited

U.S. PATENT DOCUMENTS 5,325,433 A * 6/1994 Torii .................. H04L 9/0863
380/282
6,317,834 B1 * 11/2001 Gennaro ................. G06F 21/32
380/286
(Continued)

FOREIGN PATENT DOCUMENTS

JP    2000224158 A * 8/2000 ............ H04L 9/12
JP    2008268829 A * 10/2008 ........... H04L 9/0891

*Primary Examiner* — Jeffrey C Pwu
*Assistant Examiner* — Ali H. Cheema
(74) *Attorney, Agent, or Firm* — Jefferson IP Law, LLP

(57) ABSTRACT

A secured device including a security hardware module and a method thereof are provided. The secured device generates first user authentication information based on a user input, generates encryption key generation information corresponding to the first user authentication information, receives second user authentication information from an electronic device, and transmits to the electronic device the encryption key generation information corresponding to the first user authentication information when the second user authentication information matches the first user authentication information. The first user authentication information and the encryption key generation information are secured by the security hardware module.

19 Claims, 12 Drawing Sheets

(51) Int. Cl.
*H04L 9/08* (2006.01)
*H04L 9/14* (2006.01)
*H04L 9/30* (2006.01)
*H04W 12/06* (2009.01)
*H04W 12/04* (2009.01)
*H04W 4/70* (2018.01)
*H04L 9/12* (2006.01)

(52) U.S. Cl.
CPC .................. *H04L 9/14* (2013.01); *H04L 9/30* (2013.01); *H04L 9/3234* (2013.01); *H04L 63/06* (2013.01); *H04L 63/061* (2013.01); *H04W 12/04* (2013.01); *H04L 9/0863* (2013.01); *H04L 9/0891* (2013.01); *H04L 9/12* (2013.01); *H04L 9/3226* (2013.01); *H04L 63/0428* (2013.01); *H04L 63/0823* (2013.01); *H04W 4/70* (2018.02); *H04W 12/06* (2013.01)

(58) Field of Classification Search
CPC ........ H04L 9/12; H04W 12/04; H04W 12/06; H04W 4/70; G06F 21/10; G06F 21/32; G06F 21/80; G06F 21/6245; G06F 21/608; G06F 3/1219; G06F 3/1222; G06F 21/31; G06F 21/34; G06Q 20/341
USPC ....... 713/168, 189, 170, 186, 159, 171, 165, 713/172, 177; 380/270, 282, 20, 278, 380/286; 726/2, 9, 28; 358/1.14, 1.15
See application file for complete search history.

(56) References Cited

U.S. PATENT DOCUMENTS

| | | | | |
|---|---|---|---|---|
| 7,571,468 | B1* | 8/2009 | Williams | G06F 21/34 726/9 |
| 7,620,177 | B2 | 11/2009 | Ibrahim et al. | |
| 8,271,783 | B2 | 9/2012 | Ibrahim et al. | |
| 8,832,778 | B2 | 9/2014 | McCune et al. | |
| 2002/0129250 | A1* | 9/2002 | Kimura | G06Q 20/341 713/172 |
| 2004/0250066 | A1 | 12/2004 | Di Luoffo et al. | |
| 2005/0149736 | A1* | 7/2005 | Kim | H04L 9/3226 713/177 |
| 2005/0210253 | A1* | 9/2005 | Shigeeda | H04L 9/0863 713/171 |
| 2005/0226423 | A1* | 10/2005 | Li | H04L 63/062 380/278 |
| 2005/0275866 | A1* | 12/2005 | Corlett | G06F 21/608 358/1.14 |
| 2005/0283826 | A1 | 12/2005 | Tahan | |
| 2005/0289343 | A1 | 12/2005 | Tahan | |
| 2006/0056634 | A1* | 3/2006 | Lee | H04L 63/20 380/270 |
| 2006/0089123 | A1 | 4/2006 | Frank | |
| 2006/0092461 | A1* | 5/2006 | Kitada | G06F 3/1222 358/1.15 |
| 2006/0155990 | A1* | 7/2006 | Katsube | H04L 63/0428 713/168 |
| 2007/0106894 | A1* | 5/2007 | Zhang | H04L 63/0428 713/170 |
| 2007/0107042 | A1* | 5/2007 | Corona | H04L 63/0853 726/2 |
| 2007/0294528 | A1* | 12/2007 | Shoji | G06F 21/10 713/159 |
| 2009/0240950 | A1* | 9/2009 | Suzuki | G06F 21/32 713/186 |
| 2009/0327730 | A1* | 12/2009 | Deishi | H04L 63/0435 713/171 |
| 2010/0161983 | A1* | 6/2010 | Lee | H04L 9/0822 713/168 |
| 2010/0191981 | A1* | 7/2010 | Obuchi | G06F 21/80 713/189 |
| 2012/0072714 | A1 | 3/2012 | Grandcolas et al. | |
| 2013/0315393 | A1* | 11/2013 | Wang | H04W 12/04 380/270 |
| 2015/0324605 | A1* | 11/2015 | Yoon | G06F 21/31 726/28 |
| 2015/0371052 | A1* | 12/2015 | Lepeshenkov | H04L 63/06 713/165 |
| 2015/0378648 | A1* | 12/2015 | Yasukawa | G06F 3/1219 358/1.14 |
| 2016/0034708 | A1* | 2/2016 | Shim | G06F 21/6245 713/186 |

* cited by examiner

METHOD AND APPARATUS FOR PROVIDING SECURITIES TO ELECTRONIC DEVICES

CROSS-REFERENCE TO RELATED APPLICATION(S)

This application claims the benefit under 35 U.S.C. § 119(a) of a Korean patent application filed on Feb. 2, 2016 in the Korean Intellectual Patent Office and assigned Serial number 10-2016-0012895, the entire disclosure of which is hereby incorporated by reference.

TECHNICAL FIELD

The present disclosure relates to apparatuses and methods of providing a security feature to an electronic device. More particularly, the present disclosure relates to apparatuses and methods of providing a security feature to an electronic device by using a secured device.

BACKGROUND

As Internet of things (IoT) technology has developed, an electronic device such as a mobile phone, a refrigerator, a television and a printer may perform a variety of additional features, a plurality of users may share one or more devices, and a single user may manage a plurality of devices.

IoT technology may use a variety of technologies such as a sensing technology for sensing information, a communication technology for communicating the sensed information, a chip technology, an operating system technology, an embedded system technology, a platform technology, a big data processing technology, a data mining technology, a web service technology, an application service technology, a web of things (WoT) technology, etc.

Security technologies for confidentiality, integrity, authentication, access control, prevention of hacking, anomaly detection may be used. Data mining and big data processing technologies may require improved security for protecting privacy of users.

Confidentiality may become an important factor in multi-device environments. A variety of algorithms may be used to protect confidentiality. Security software and security hardware may be used for these algorithms. In order to use security hardware for a product, the product may require both of a security hardware module and a security software module. The security software module may be required to be modified based on hardware components of the product and software programs installed in the product. Therefore, it may generate additional expenses to install the security hardware module in the product.

Devices that are not provided with a security hardware module may have security vulnerability in comparison to devices having a security hardware module therein.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a secured device and a method of providing a security feature to electronic devices.

In accordance with an aspect of the present disclosure, a method is provided. The method includes generating, at a secured device including a security hardware module, first user authentication information based on a user input, generating, at the secured device, encryption key generation information corresponding to the first user authentication information, receiving, at the secured device, second user authentication information from an electronic device, and transmitting from the secured device to the electronic device the encryption key generation information corresponding to the first user authentication information when the second user authentication information matches the first user authentication information. The first user authentication information and the encryption key generation information are secured by the security hardware module of the secured device.

The method further includes decrypting the received second user authentication information based on a secret key of the secured device, encrypting the encryption key generation information based on a public key of the electronic device, and transmitting the encrypted encryption key generation information to the electronic device.

The method further includes receiving, at the secured device, a random number generated and transmitted by the electronic device and encrypting, at the secured device, the encryption key generation information based on the received random number.

The method further includes encrypting, at the secured device, the encryption key generation information based on the first user authentication information.

The method further includes receiving, at the secured device, device information of the electronic device from the electronic device, authenticating, at the secured device, the electronic device based on the received device information of the electronic device, and the receiving the second user authentication information may include receiving the second user authentication information from the authenticated electronic device.

The method further includes transmitting device information of the secured device from the secured device to the electronic device to authenticate the secured device at the electronic device.

The encryption key generation information may be used to generate an encryption key.

Information may be stored based on the generated encryption key.

Permission for a user may be set based on the generated encryption key.

The generated encryption key may be removed based on a predetermined standard.

The second user authentication information and the encryption key generation information may be removed after the encryption key is generated.

The encryption key generation information may be first encryption key generation information, and second encryption key generation information generated by the electronic device may be further used to generate the encryption key.

The second encryption key generation information may be generated based on the second user authentication information.

In accordance with another aspect of the present disclosure, a non-transitory computer-readable storage medium is provided. The non-transitory computer-readable storage medium includes instructions, which, when executed, cause a secured device including a security hardware module to generate first user authentication information based on a user input, generate encryption key generation information corresponding to the first user authentication information, receive second user authentication information from an electronic device, and transmit to the electronic device the encryption key generation information corresponding to the first user authentication information when the second user authentication information matches the first user authentication information. The first user authentication information and the encryption key generation information are secured by the security hardware module of the secured device.

The instructions may further cause the secured device to decrypting the received second user authentication information based on a secret key of the secured device, encrypt the encryption key generation information based on a public key of the electronic device, and transmit the encrypted encryption key generation information to the electronic device.

The instructions may further cause the secured device to receive a random number generated and transmitted by the electronic device and encrypt the encryption key generation information based on the received random number.

The instructions may further cause the secured device to encrypt the encryption key generation information based on the first user authentication information.

The instructions may further cause the secured device to receive device information of the electronic device from the electronic device and authenticate the electronic device based on the received device information of the electronic device.

The encryption key generation information may be first encryption key generation information, and second encryption key generation information generated by the electronic device may be further used to generate the encryption key.

In accordance with another aspect of the present disclosure, a device is provided. The device includes a security hardware module, a memory storing instructions, and a processor configured to execute the instructions to generate first user authentication information based on a user input, generate encryption key generation information corresponding to the first user authentication information, receive second user authentication information from an electronic device, and transmit to the electronic device the encryption key generation information corresponding to the first user authentication information when the second user authentication information matches the first user authentication information. The first user authentication information and the encryption key generation information are secured by the security hardware module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
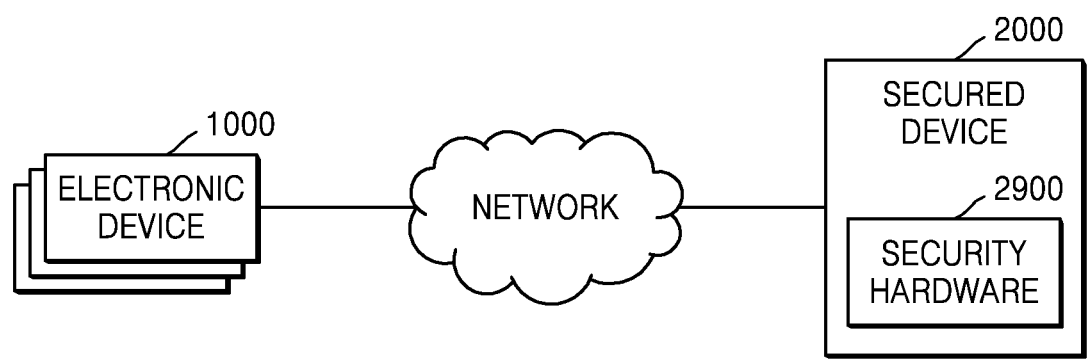
FIG. 1 illustrates a system according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the singular forms "a", "an" and "the" are intended to include the plural forms as well, unless the context clearly indicates otherwise. It should be understood that the terms "comprises," "comprising," "including," and "having" are inclusive and therefore specify the presence of stated features or components, but do not preclude the presence or addition of one or more other features or components. Numbers described herein are examples for helping understanding, and embodiment should not be limited to the numbers.

In the present disclosure, the term such as " . . . unit" or " . . . module" should be understood as a unit in which at least one function or operation is processed and may be embodied as hardware, software, or a combination of hardware and software.

It should be understood that, although the terms "first," "second," etc. may be used herein to describe various elements, and these elements should not be limited by these terms. These terms are used to distinguish one element from another. For example, a first element may be termed a second element within the technical scope of an embodiment.

Terms used herein will now be briefly described and then one or more embodiments will be described in detail.

A security hardware module may be referred to as any hardware module being used in a device for security. The security hardware module may include a processor and a memory. Various encryption keys may be used and managed more securely by the security hardware module. The security hardware module may be included in a device as a chip, may be mounted to the device and unmounted from the device, or may be embodied as one of processors. For example, the security hardware module may be a trusted platform module (TPM) chip, a Smartcard, and a TrustZone, but is not limited thereto.

In the present disclosure, user authentication information may be referred to as information used for authenticating a user or a device. For example, the user authentication information may include password information and user identification information such as a user identification (ID), and may include a biometric authentication information. The user authentication information may be registered in a device initially, and used to be compared with information received later in order to authenticate a user or a device.

At least part of the user authentication information may be hashed and then used to authenticate a user or a device. For example, the password information may be hashed.

In the present disclosure, encryption key generation information may be referred to as information used for generating an encryption key in a device. The device may generate the encryption key based on the encryption key generation information, and encrypt data according to the encryption key.

FIG. 1 illustrates a system according to an embodiment of the present disclosure.

Confidentiality may become an important factor in multi-device environments. A variety of algorithms may be used to protect confidentiality. Encryption algorithm requires an encryption key to be managed more securely to protect confidentiality. The security hardware module may be used to manage the encryption key more securely.

In order to use security hardware for a product, the product may require both of a security hardware module and a security software module. The security software module may be required to be modified based on hardware components of the product and software programs installed in the product. Therefore, it may generate additional expenses to install the security hardware module in the product.

Due to the additional expenses, the security hardware module may be included in a few devices. Devices that are not provided with a security hardware module may have security vulnerability in comparison to devices having a security hardware module therein.

According to an embodiment, a secured device including the security hardware module may be connected to electronic devices that are not provided with the security hardware module to provide them with a security feature. Encryption key generation information may be secured by the security hardware module of the secured device and transmitted to the electronic devices only when the electronic devices are authenticated, and the electronic devices may generate an encryption key based on the encryption key generation information. In the present disclosure, the secured device may be referred to as a device having a security hardware module, but an electronic device also may include a security hardware module.

According to an embodiment, an encryption key of a security hardware module is not exposed outside of a secured device and encryption key generation information is transmitted from the secured device to an electronic device, thus, security of the secured device may improve and the electronic device may be provided with higher security by using the encryption key generation information to be secured and transmitted by the secured device.

According to an embodiment, encryption key generation information is communicated between a secured device and an electronic device and the electronic devices uses an encryption key temporarily generated based on the encryption key generation information, thus, exposure of an encryption key may be suppressed. The encryption key may be removed from the electronic device based on a preset standard. For example, the encryption key may be removed from the electronic device, when operation using the encryption key is finished, when a certain period of time passes after using the encryption key, when a certain period of time passes after generating the encryption key, etc.

Improvement of Security of an Electronic Device by Using a Secured Device

Figure 2:
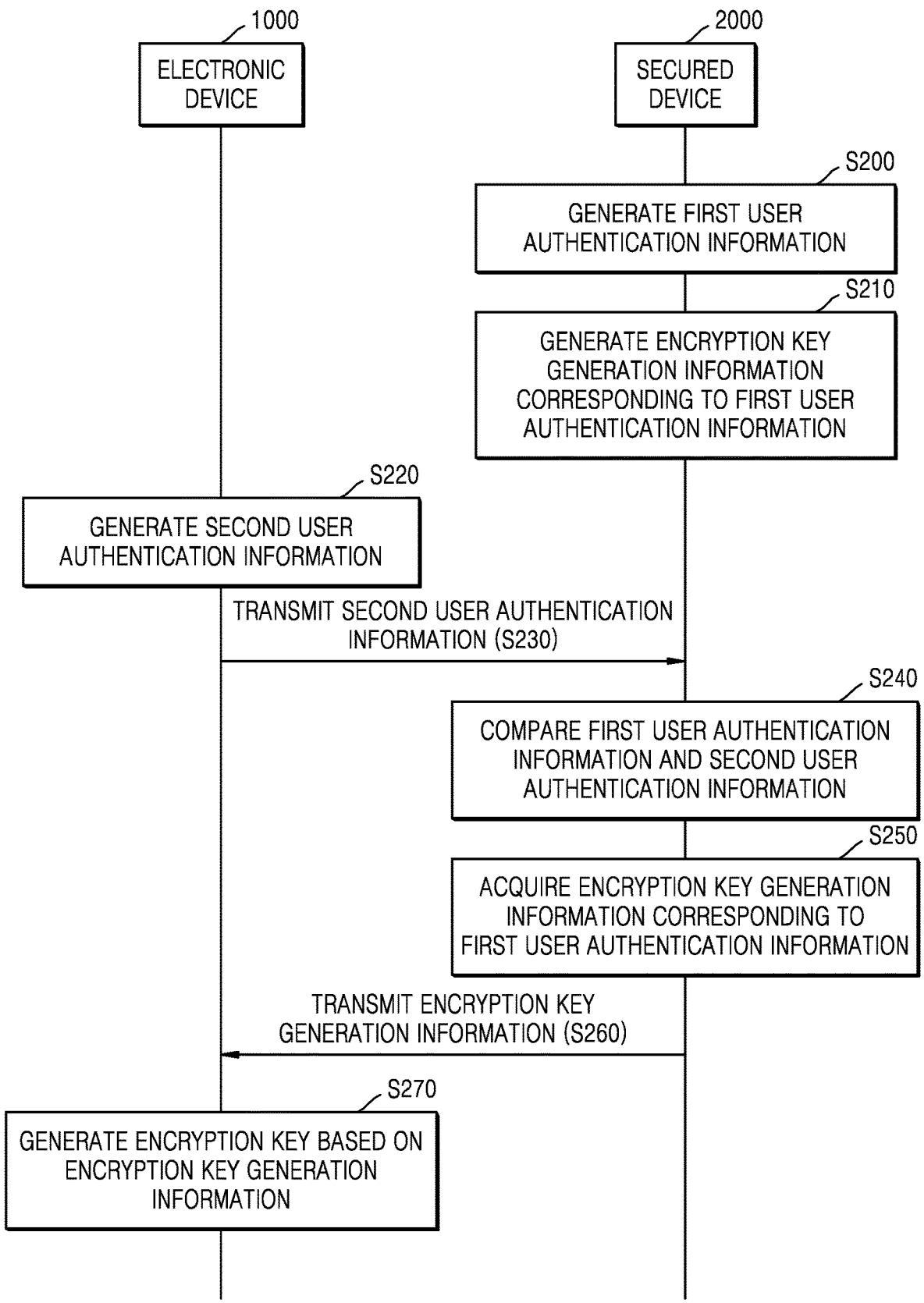
FIG. 2 illustrates a flowchart of a method of providing a security feature to an electronic device by using a secured device according to an embodiment of the present disclosure.

FIG. 2 illustrates a flowchart of a method of providing a security feature to an electronic device by using a secured device according to an embodiment of the present disclosure.

In operation S200, the secured device may generate first user authentication information based on a user input.

Here, the first user authentication information may be referred to as user authentication information that is registered in the secured device. The first user authentication information may include password information and user identification information, but is not limited thereto, may include a biometric authentication information.

The generated first user authentication information may be stored in the secured device, and compared with second user authentication information. Here, the second user authentication information may be referred to as user authentication information that is received at the electronic device to authenticate a user or a device. At least part of the first user authentication information may be hashed. When the first user authentication information includes first user identification information and first password information, the first password information may be hashed.

The secured device may store a plurality of pieces of first user authentication information for a plurality of users.

In operation S210, the secured device may generate encryption key generation information corresponding to the first user authentication information (or the first user identification information) generated in operation S200.

The first user authentication information and encryption key generation information of a user may correspond to each other. In an embodiment, the first user authentication information of the user may correspond to a plurality of pieces of encryption key generation information.

The generated encryption key generation information may be encrypted based on the corresponding first user authentication information and stored in the secured device. The encryption key generation information may be used to generate an encryption key after user authentication.

The first user authentication information and the encryption key generation information may be secured by the security hardware module of the secured device. Explanation of encryption key generation information secured by a security hardware module is referred to FIG. 3, FIG. 4, FIG. 5, and FIG. 6.

In operation S220, the electronic device may generate second user authentication information based on a user input.

The second user authentication information may include second password information and second user identification information, but is not limited thereto, and may include a biometric authentication information. At least part of the second user authentication information may be hashed. When the second user authentication information includes the second user identification information and the second password information, the second password information may be hashed.

In operation S230, the electronic device may transmit to the secured device the second user authentication information generated in operation S220.

The electronic device may transmit to the secured device a message including the second user authentication information.

In operation S240, the secured device may compare the first user authentication information with the second user authentication information transmitted from the electronic device in operation S230.

When a plurality of pieces of the first user authentication information for a plurality of users are stored in the secured device, the secured device may retrieve a piece of the first user authentication information corresponding to the second user authentication information received from the electronic device.

When the secured device fails to retrieve the first user authentication information corresponding to the second user authentication information, the secured device may transmit to the electronic device a message indicating that authentication has been failed.

In operation S250, the secured device may obtain encryption key generation information corresponding to the first user authentication information (or the first user identification information) retrieved in operation S240.

In an embodiment, the piece of the first user authentication information (or the first user identification information) may correspond to a piece of encryption key generation information. In an embodiment, the piece of the first user authentication information (or the first user identification information) may correspond to a plurality of pieces of encryption key generation information.

In an embodiment, the secured device may use the first user authentication information as an encryption key to encrypt the encryption key generation information. The encryption key generation information may be encrypted based on a part of the first user authentication information. When the first user authentication information includes first user identification information and first password information, the first password information may be used to encrypt the encryption key generation information.

In operation S260, the secured device may transmit to the electronic device the encryption key generation information acquired in operation S250.

The secured device may transmit to the electronic device a message including the encryption key generation information.

In operation S270, the electronic device may generate an encryption key based on the encryption key generation information transmitted from the secured device in operation S260.

In an embodiment, when the encryption key generation information is encrypted based on the first user authentication information, the electronic device may decrypt the encrypted encryption key generation information based on the second user authentication information.

According to an embodiment, an electronic device, even not including a security hardware module, may be provided with higher security as the secured device.

According to an embodiment, encryption key generation information is communicated between a secured device and an electronic device and the electronic devices uses an encryption key temporarily generated based on the encryption key generation information, thus, exposure of an encryption key may be suppressed.

Registration of a User by Using a Key

Figure 3:
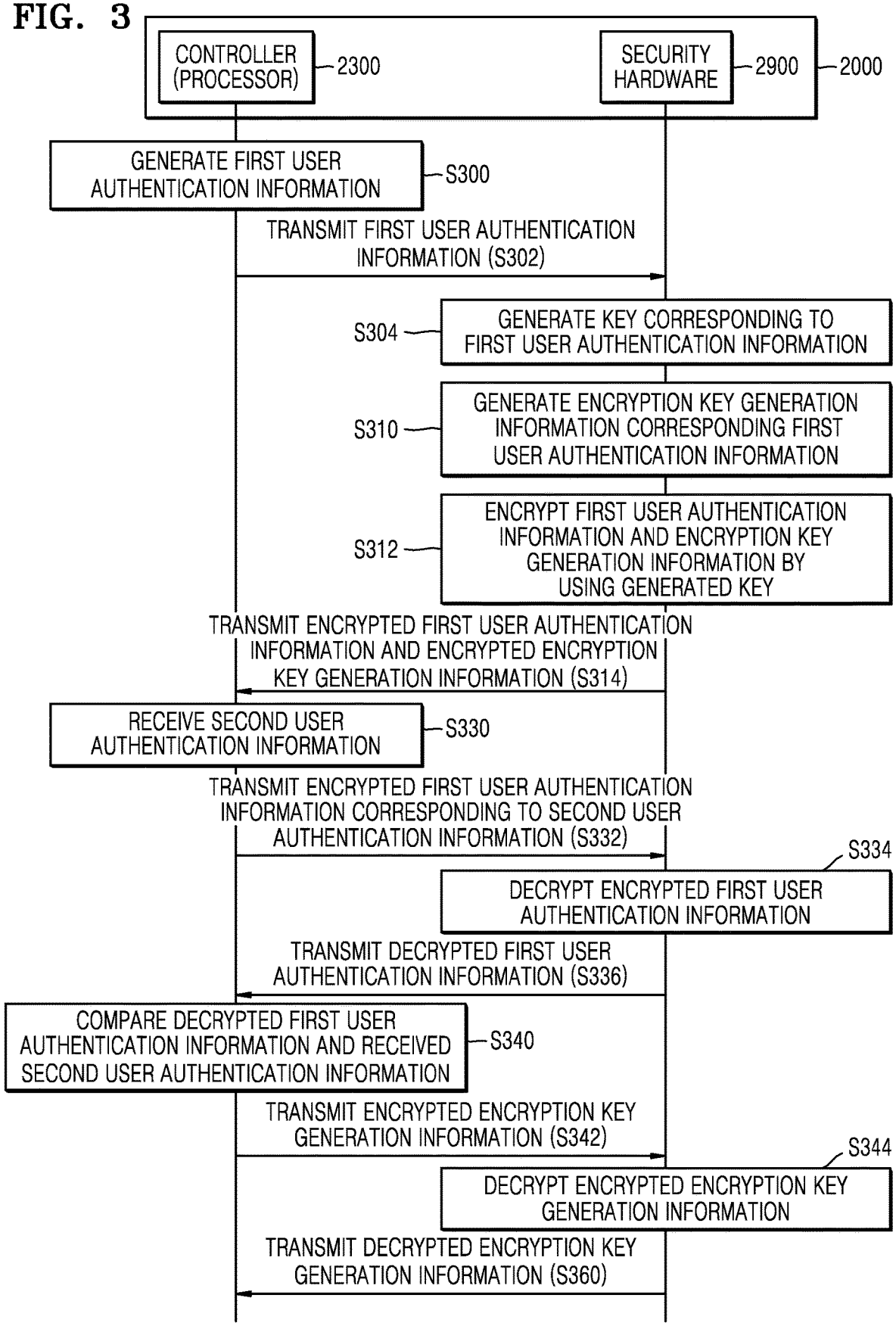
FIG. 3 illustrates a flowchart of a method of using a security hardware module in a secured device according to an embodiment of the present disclosure.

FIG. 3 illustrates a flowchart of a method of using a security hardware module in a secured device according to an embodiment of the present disclosure.

Figure 4:
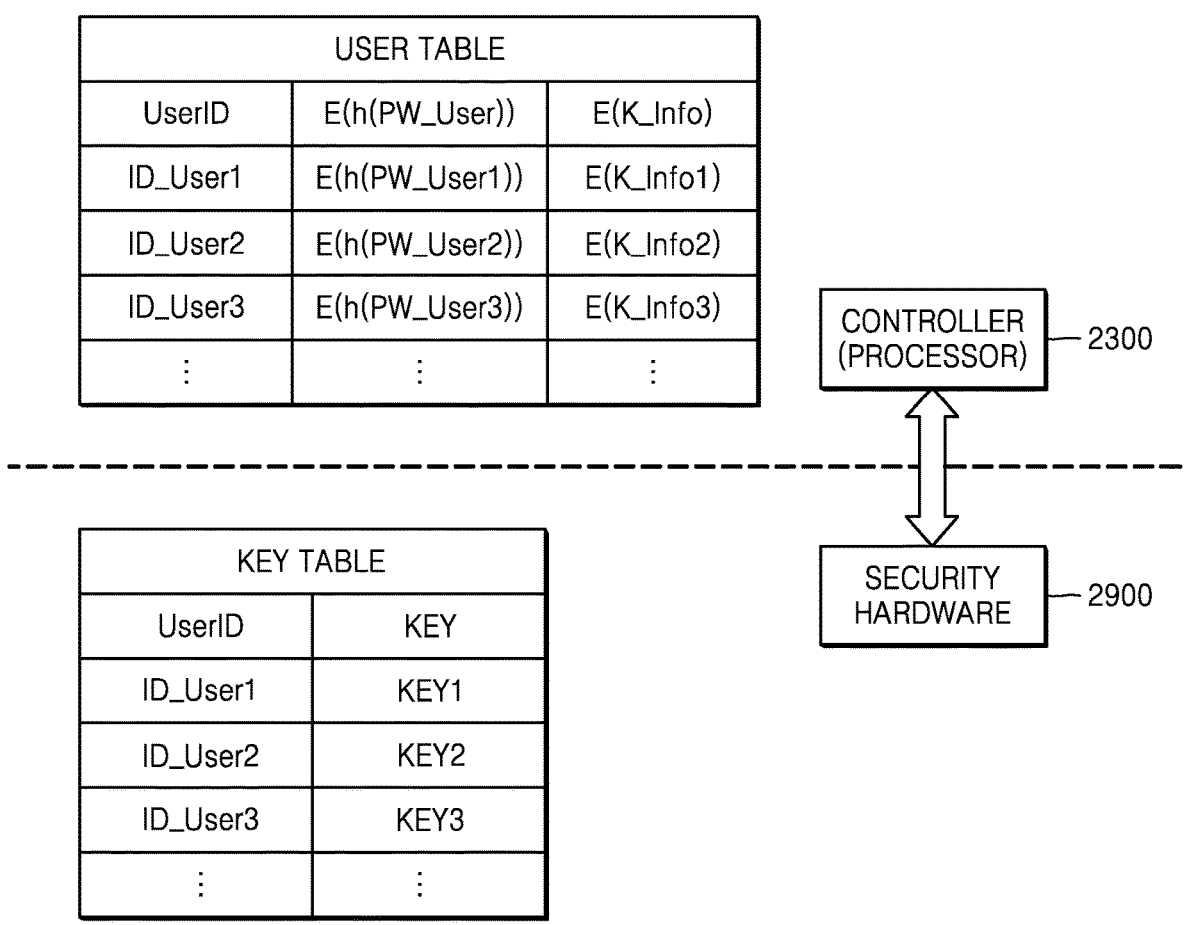
FIG. 4 illustrates a user table and a key table used in a secured device according to an embodiment of the present disclosure.

FIG. 4 illustrates a user table and a key table used in a secured device according to an embodiment of the present disclosure.

According to an embodiment, the secured device may include a controller and security hardware module.

The controller of the secured device may control overall operations of the secured device to perform various functions, and the secured device may manage encryption keys by using the security hardware module.

Information may be communicated between the controller and the security hardware module, and information processed in the security hardware module may be protected more securely.

In operation S300, the controller of the secured device may generate first user authentication information based on a user input. Operation S300 may be substantially identical to operation S200.

The first user authentication information may include first user identification information and first password information as illustrated in FIG. 4, where the first user identification information of each user is respectively represented as ID_User1, ID_User2, and ID_User3, corresponding password information of the each user is respectively represented as PW_User1, PW_User2, and PW_User3, and hashed first password information of the each user is respectively represented h(PW_User1), h(PW_User2), h(PW_User3).

In an embodiment, the controller may obtain authority from the security hardware module before transmitting the first user authentication information to the security hardware module.

In operation S302, the controller of the secured device may transmit to the security hardware module of the secured device the first user authentication information generated in operation S300.

When the first user authentication information includes the first user identification information and the first password information, the first user identification information and the hashed first password information may be transmitted to the security hardware module.

In operation S304, the security hardware module of the secured device may generate a key corresponding to the first user authentication information transmitted from the controller of the secured device in operation S302.

The generated key may be used as an encryption key to encrypt information. The first user authentication information transmitted from the controller may be encrypted based on the generated key. Here, a part of the first user authentication information may be encrypted. When the first user authentication information includes the first user identification information and the first password information, the first password information may be encrypted based on the generated key.

The security hardware module may store the first user identification information and the generated key which correspond to each other. For example, referring to FIG. 4, the security hardware module may store a plurality of pieces of the first user identification information ID_User1, ID_User2, and ID_User3, and corresponding generated keys KEY1, KEY2, and KEY3.

In operation S310, the security hardware module of the secured device may generate encryption key generation information corresponding to the first user authentication information (or the first user identification information) transmitted from the controller of the secured device in operation S302. Operation S310 may be substantially identical to operation S210.

In operation S312, the security hardware module of the secured device may encrypt the first user authentication information and the encryption key generation information based on the key generated in operation S304.

Here, a part of the first user authentication information may be encrypted based on the generated key. For example, when the first user authentication information includes the first user identification information and the first password information, the hashed first password information h(PW_User) may be encrypted respectively based on the generated key. The encrypted first password information is represented as E(h(PW_User)) in FIG. 4. When the encryption key generation information K_Info is encrypted based on the generated key KEY, the encrypted encryption key generation information is represented as E(K_Info).

In operation S314, the security hardware module of the secured device may transmit to the controller the first user authentication information and the encryption key generation information encrypted in operation S312.

The first user authentication information (or the first password information) and the encryption key generation information may be removed from the security hardware module after operation S314.

The controller may store the encrypted first user authentication information and encryption key generation information in a memory of the secured device. The first user authentication information may include the first user identification information and the first password information, and the first user identification information, encrypted first password information E(h(PW_User)), and corresponding encryption key generation information E(K_Info) may be stored in the memory of the secured device.

According to an embodiment, the first user authentication information and corresponding encryption key generation information are encrypted to be saved, the risk of exposure may be suppressed.

According to an embodiment, an encryption key used to encrypt the first user authentication information and the encryption key generation information is not exposed to the outside of the secured device, security of the secured device may improve.

Authentication of a User by Using a Key

In operation S330, the controller of the secured device may receive second user authentication information from an electronic device. Operation S330 may be substantially identical to operation S230.

In operation S332, the controller of the secured device may retrieve first user authentication information corresponding to the second user authentication information received from the electronic device in operation S330, and then transmit the retrieved first user authentication information to the security hardware module of the secured device.

Here, the first user authentication information corresponding to the second user authentication information may be retrieved by comparing the second user identification with the first user identification information.

Here, the controller may fail to read the first user authentication information when the first user authentication information is encrypted.

When the first user authentication information includes the first user identification information and the first password information, the controller of the secured device may fail to read the first password information when the first password information is encrypted.

In an embodiment, the controller may obtain authority from the security hardware module before transmitting to the security hardware module the encrypted first user authentication information corresponding to the second user authentication information.

In operation S334, the security hardware module of the secured device may decrypt the encrypted first user authentication information transmitted from the controller of the secured device in operation S332.

When the first user authentication information includes the first user identification information, and the first password information that is encrypted, the security hardware module of the secured device may decrypt the encrypted first password information.

Referring to FIG. 4, the encrypted first password information E(h(PW_User1)) may be decrypted based on a corresponding key KEY1, and the decrypted first password information h(PW_User1) may be obtained by the security hardware module.

In operation S336, the security hardware module of the secured device may transmit to the controller the first user authentication information decrypted in operation S334.

The decrypted first user authentication information may be read by the controller. For example, the controller may read the decrypted first password information h(PW_User1).

The decrypted first password information may be removed from the security hardware module after operation S336.

In operation S340, the controller of the secured device may compare the first user authentication information decrypted in operation S336 with the second user authentication information transmitted from the electronic device in operation S330 in order to acquire corresponding encrypted encryption key generation information.

When the decrypted first user authentication information matches the received second user authentication information, the controller of the secured device may obtain encrypted encryption key generation information corresponding to the decrypted first user authentication information. For example, when decrypted first password information h(PW_User1) matches the second password information, the controller of the secured device may obtain encrypted encryption key generation information E(K_Info1) corresponding to the first user identification information ID_User1.

The controller of the secured device may fail to read the acquired encryption key generation information when the acquired encryption key generation information is encrypted.

In operation S342, the controller of the secured device may transmit to the security hardware module of the secured device the encrypted encryption key generation information acquired in operation S340.

In operation S344, the security hardware module of the secured device may decrypt the encrypted encryption key generation information transmitted from the controller of the secured device in operation S342.

The security hardware module may decrypt, based on a key corresponding to the first user authentication information (or the first user identification information) transmitted from the controller in operation S332, the encrypted encryption key generation information transmitted from the controller in operation S342. When the first user authentication information includes the first user identification information and the first password information, a key corresponding to the first user identification information may be used to decrypt the encrypted encryption key generation information. For example, referring to FIG. 4, the encrypted encryption key generation information E(K_Info1) is decrypted based on the key KEY1 corresponding to the first user identification information ID_User1, thereby, the security hardware module may obtain the decrypted encryption key generation information K_Info1.

In operation S360, the security hardware module of the secured device may transmit to the controller of the secured device the encryption key generation information decrypted in operation S344.

The decrypted encryption key generation information may be read by the controller.

The encryption key generation information may be removed from the security hardware module after operation S360.

The controller of the secured device may generate an encryption key based on the encryption key generation information transmitted from the security hardware module.

The encryption key generation information may be removed from the security hardware module after generation of the encryption key.

In an embodiment, registration and authentication of a user by using a key may be performed by using a TrustZone function of a processor. For example, generation of the first user authentication information and reception of the second user authentication information may be performed in Normal World of the processor. Further, encryption and decryption of the first user authentication information, and generation, encryption, and decryption of the encryption key generation information may be performed in Secure World of the processor.

Registration of a User by Using Asymmetric Keys

Figure 5:
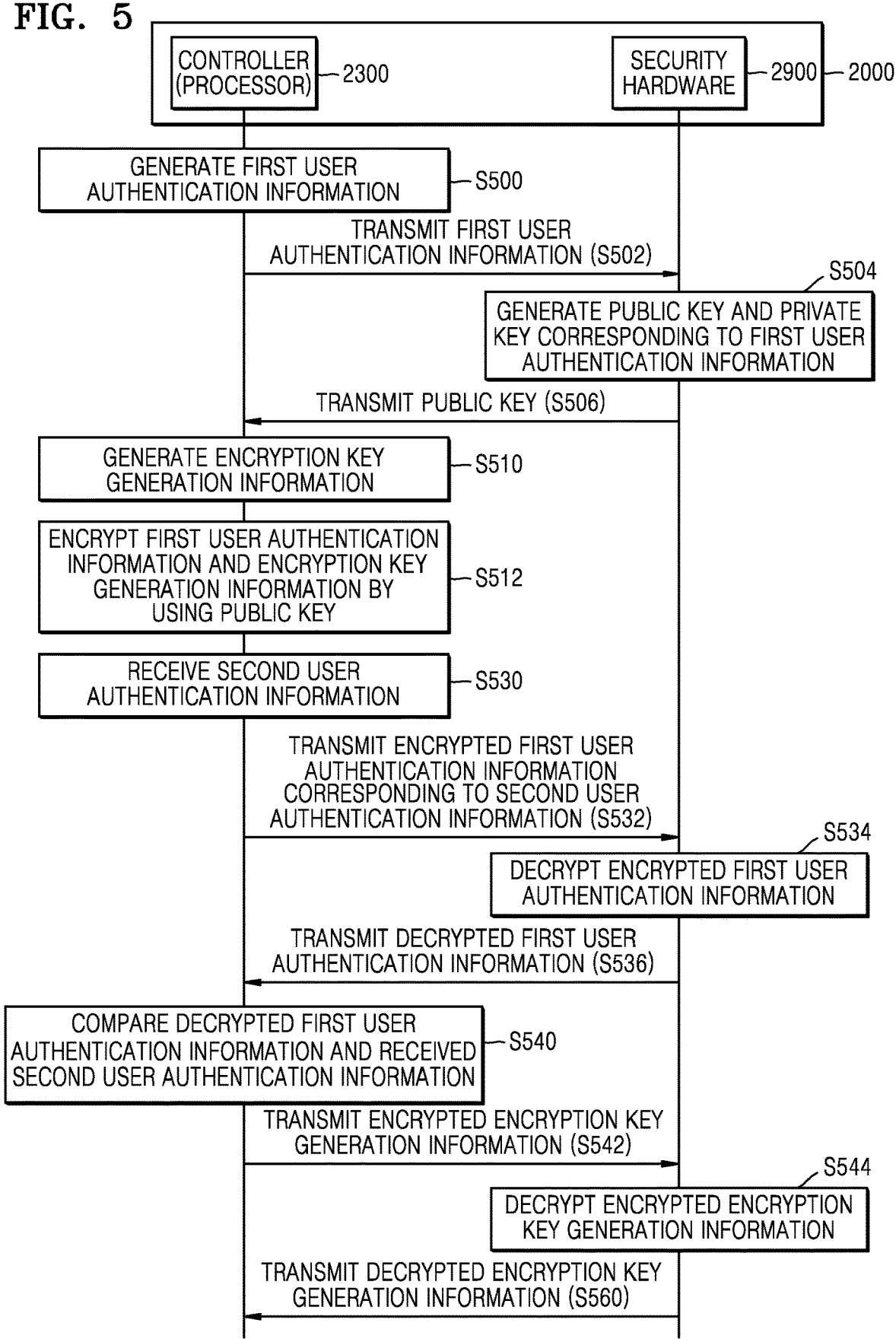
FIG. 5 illustrates a flowchart of a method of using a security hardware module in a secured device according to an embodiment of the present disclosure.

FIG. 5 illustrates a flowchart of a method of using a security hardware module in a secured device according to an embodiment of the present disclosure.

Figure 6:
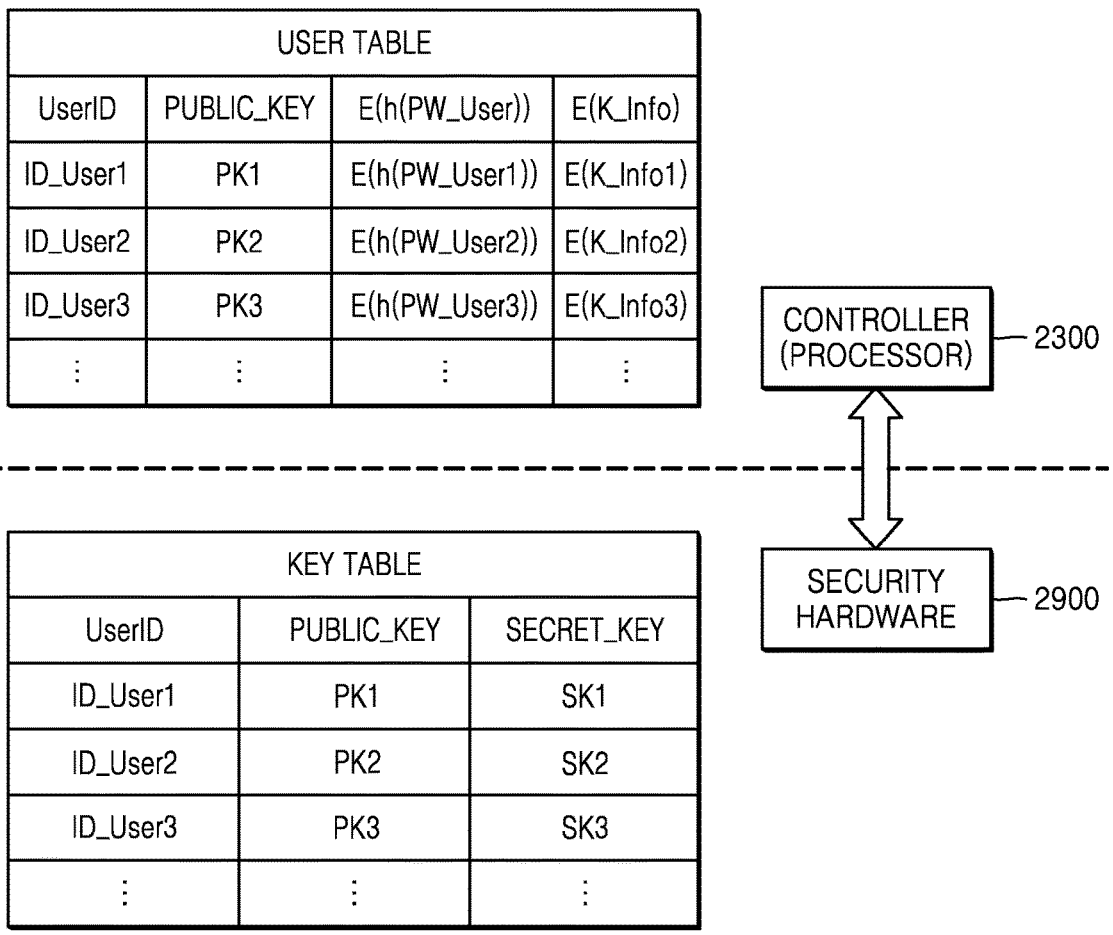
FIG. 6 illustrates a user table and a key table used in a secured device according to an embodiment of the present disclosure.

FIG. 6 illustrates a user table and a key table used in a secured device according to an embodiment of the present disclosure.

Information may be communicated between the controller and the security hardware module, and information processed in the security hardware module may be protected more securely. According to an embodiment, security of the secured device may improve by encrypting the information communicated between the controller and the security hardware module based on asymmetric keys such as a public key and a secret key of the security hardware module. The public key and the secret key may differ among users. The secret key may be referred to as a private key.

In operation S500, the controller of the secured device may generate first user authentication information based on a user input. Operation S500 may be substantially identical to operations S200 and S300.

In an embodiment, the controller may obtain authority from the security hardware module before transmitting the first user authentication information to the security hardware module.

In operation S502, the controller of the secured device may transmit to the security hardware module of the secured device the first user authentication information generated in operation S500. Operation S502 may be substantially identical to operation S302. When the first user authentication information includes first user identification information and first password information, the first user identification information may be transmitted to the security hardware module.

In operation S504, the security hardware module of the secured device may generate a public key and a secret key corresponding to the first user authentication information (or the first user identification information) transmitted from the controller of the secured device in operation S502.

Here, the generated public key of the security hardware module may be transmitted to the controller, and the secret key of the security hardware module may be stored in the security hardware module. The public key of the security hardware module may be used to encrypt information by the controller, the information encrypted based on the public key of the security hardware module may be decrypted based on the secret key of the security hardware module.

The security hardware module may store the first user identification information and the corresponding generated keys. For example, referring to FIG. 6, the security hardware module may store the first user identification information, and corresponding asymmetric keys such as a public key and a secret key.

In operation S506, the security hardware module of the secured device may transmit to the controller of the secured device the public key generated in operation S502.

The public key of the security hardware module may be removed from the security hardware module after operation S506.

In operation S510, the controller of the secured device may generate encryption key generation information corresponding to the first user authentication information (or the user identification information) generated in operation S500. Operation S510 may be substantially identical to operations S210 and S310.

In operation S512, the controller of the secured device may encrypt the first user authentication information and the encryption key generation information based on the key generated in operation S506. Operation S512 may be substantially identical to operation S312.

Here, a part of the first user authentication information may be encrypted based on the transmitted public key. For example, when the first user authentication information includes the first user identification information and the first password information, the hashed first password information h(PW_Use1), h(PW_User2), and h(PW_User3) may be encrypted respectively based on the public keys PK1, PK2, and PK3. The encrypted first password information is represented as E(h(PW_User1)), E(h(PW_User2)), and E(h(P-W_User3)) in FIG. 6. When the encryption key generation information K_Info is encrypted based on the public key PK, the encrypted encryption key generation information is represented as E(K_Info).

The controller may store the encrypted first user authentication information and encryption key generation information in a memory of the secured device. The first user authentication information may include the first user identification information and the first password information. Referring to FIG. 6, the first user identification information ID_User1, ID_User2, and ID_User3, encrypted first password information E(h(PW_User1)), E(h(PW_User2)), and E(h(PW_User3)), and corresponding encryption key generation information E(K_Info1), E(K_Info2), and E(K_Info3) may be stored in the memory of the secured device.

According to an embodiment, the first user authentication information and corresponding encryption key generation information are encrypted to be saved, the risk of exposure may be suppressed.

According to an embodiment, a secret key used to encrypt the first user authentication information and the encryption key generation information is not exposed to the outside of the secured device, security of the secured device may improve.

Authentication of a User by Sing Asymmetric Keys

In operation S530, the controller of the secured device may receive second user authentication information from an electronic device. Operation S530 may be substantially identical to operations S230 and S330.

In operation S532, the controller of the secured device may retrieve first user authentication information corresponding to the second user authentication information received from the electronic device in operation S530, and then transmit the retrieved first user authentication information to the security hardware module of the secured device. Operation S532 may be substantially identical to operation S332.

In an embodiment, the controller may obtain authority from the security hardware module before transmitting to the security hardware module the encrypted first user authentication information corresponding to the second user authentication information.

In operation S534, the security hardware module of the secured device may decrypt the encrypted first user authentication information transmitted from the controller of the secured device in operation S532. Operation S534 may be substantially identical to operation S334.

When the first user authentication information includes the first user identification information, and the first password information that is encrypted, the security hardware module of the secured device may decrypt the encrypted first password information based on its secret key. Referring to FIG. 6, the encrypted first password information E(h(PW_User1)) may be decrypted based on a corresponding key SK1, and the decrypted first password information h(PW_User1) may be obtained by the security hardware module.

In operation S536, the security hardware module of the secured device may transmit to the controller the first user authentication information decrypted in operation S534. Operation S536 may be substantially identical to operation S336.

In operation S540, the controller of the secured device may compare the first user authentication information decrypted in operation S536 with the second user authentication information transmitted from the electronic device in operation S530 in order to acquire corresponding encrypted encryption key generation information. Operation S540 may be substantially identical to operation S340.

The controller of the secured device may fail to read the acquired encryption key generation information when the acquired encryption key generation information is encrypted.

In operation S542, the controller of the secured device may transmit to the security hardware module of the secured device the encrypted encryption key generation information acquired in operation S540. Operation S542 may be substantially identical to operation S342.

In operation S544, the security hardware module of the secured device may decrypt the encrypted encryption key generation information transmitted from the controller of the secured device in operation S542. Operation S544 may be substantially identical to operation S344.

The security hardware module may decrypt, based on a secret key corresponding to the first user authentication information (or the first user identification information) transmitted from the controller in operation S532, the encrypted encryption key generation information transmitted from the controller in operation S542. When the first user authentication information includes the first user identification information and the first password information, a secret key corresponding to the first user identification information may be used to decrypt the encrypted encryption key generation information. For example, referring to FIG. 6, the encrypted encryption key generation information E(K_Info1) is decrypted based on the key SK1 corresponding to the first user identification information ID_User1, thereby, the security hardware module may obtain the decrypted encryption key generation information K_Info1.

In operation S560, the security hardware module of the secured device may transmit to the controller of the secured device the encryption key generation information decrypted in operation S544. Operation S560 may be substantially identical to operation S360.

Communication Between Devices Using Asymmetric Keys

Figure 7:
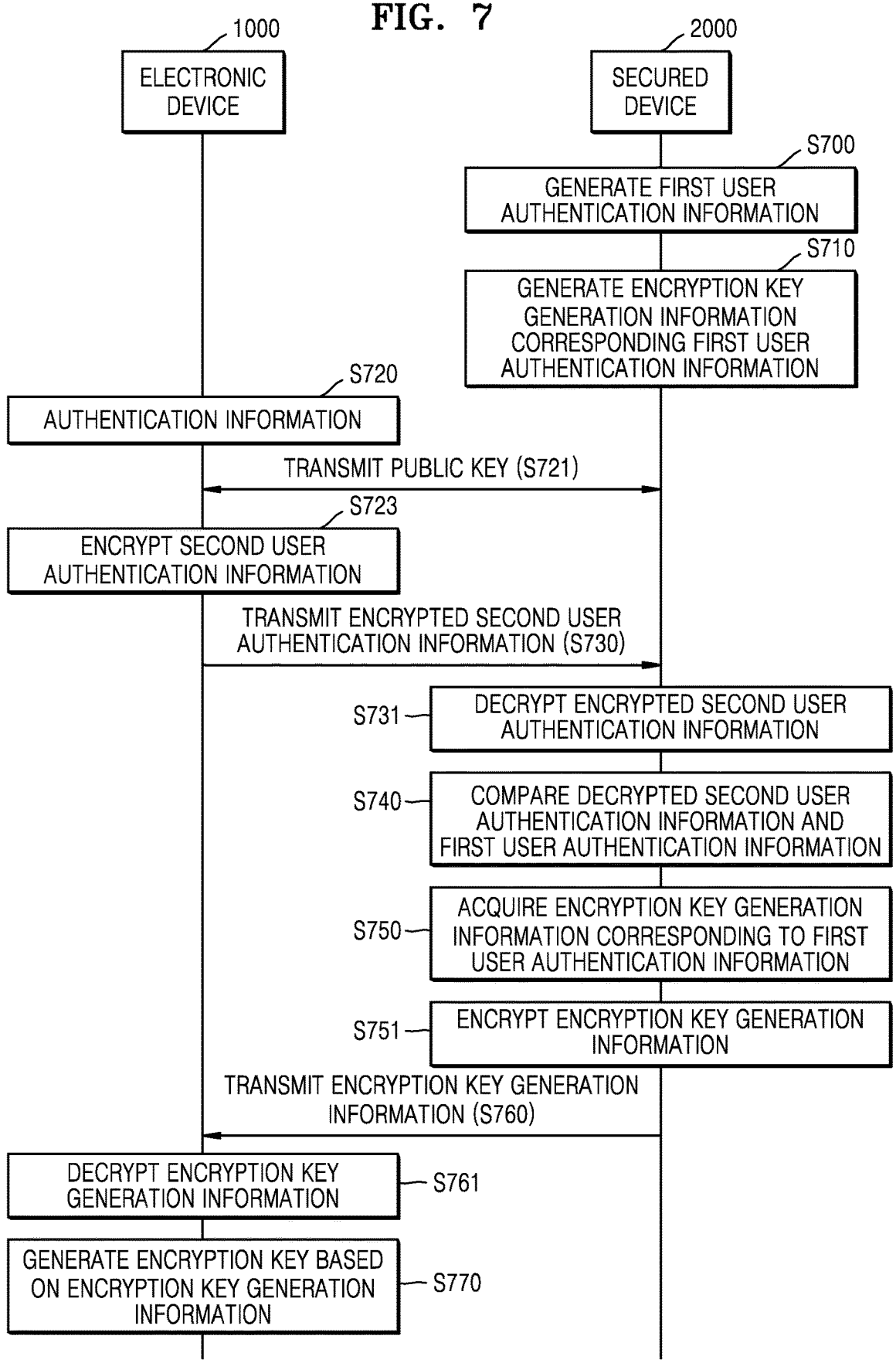
FIG. 7 illustrates a flowchart of a method of providing a security feature to an electronic device by using a public key and a secret key according to an embodiment of the present disclosure.

FIG. 7 illustrates a flowchart of a method of providing a security feature to an electronic device by using a public key and a secret key according to an embodiment of the present disclosure.

Information may be communicated between an electronic device and a secured device, and information processed in the secured device may be protected more securely. According to an embodiment, security of the electronic device and the secured device may improve by encrypting the information communicated between them based on asymmetric keys of the electronic device and the secured device.

Operations S700, S710, S720, S730, S740, S750, S760, and S770 may respectively be substantially identical to operations S200, S210, S220, S230, S240, S250, S260, and S270.

In operation S721, the electronic device may transmit its public key to the secured device, and the secured device may transmit its public key to the electronic device.

In operation S723, the electronic device may encrypt second user authentication information received in operation S720.

The second user authentication information may be encrypted based on the public key of the secured device. When the second user authentication information includes second user identification information and second password information, the second password information may be encrypted based on the public key of the secured device.

In an embodiment, the electronic device may generate a random number using a random number generator. The generated random number and the second user authentication information may be decrypted together to be transmitted. For example, a combination of the random number and the second user authentication information may be encrypted.

In operation S731, the secured device may decrypt the second user authentication information transmitted from the electronic device in operation S730.

The second user authentication information may be decrypted based on a secret key of the secured device.

In an embodiment, the secured device may receive from the electronic device a coded message regarding the combination of the random number and the second user authentication information, and decrypt the coded message based on the secret key of the secured device to acquire the random number and the second user authentication information.

In operation S751, the secured device may encrypt encryption key generation information acquired in operation S750.

In an embodiment, the encryption key generation information may be encrypted based on a public key of the electronic device received in operation S721.

In an embodiment, the secured device may use the random number from the electronic device to encrypt the encryption key generation information. For example, a combination of the random number and the encryption key generation information may be encrypted.

In operation S761, the electronic device may decrypt the encryption key generation information received from the secured device in operation S760.

In an embodiment, the encryption key generation information may be decrypted based on a secret key of the electronic device.

In an embodiment, the electronic device may receive from the secured device a coded message regarding the combination of the random number and the encryption key generation information, and decrypt the coded message based on the secret key of the electronic device to acquire the random number and the encryption key generation. The electronic device may generate an encryption key based on the encryption key generation information included in the coded message when it is determined that the random number included was generated by the electronic device.

According to an embodiment, confidentiality of the encryption key generation information may improve by using a random number.

Encryption of Encryption Key Generation Information by Using Asymmetric Keys

In an embodiment, encryption key generation information may be encrypted by using asymmetric keys, thereby, confidentiality of the encryption key generation information may improve.

Here, the first user authentication information may be used as one of asymmetric keys. When the first user authentication information includes first user identification information and first password information, the first password information may be used as one of asymmetric keys. The first password information may be hashed.

The electronic device may encrypt, based on the second user authentication information that is generated by the electronic device, encryption key generation information that is encrypted based on the first user authentication information. The encryption key generation information is encrypted when the second user authentication information coincides with the first user authentication information. Therefore, confidentiality of the encryption key generation information may improve.

In order to improve confidentiality of the encryption key generation information, a first random number that is generated by the electronic device may be used as well as the first user authentication information. For example, a combination of the first random number that is generated by the electronic device and the first user authentication information may be used as one of asymmetric keys.

The first random number and the first user authentication information may be hashed before being used as a key.

The electronic device may encrypt, based on the first random number and the second user authentication information that are generated by the electronic device, encryption key generation information that is encrypted based on the first random number that is generated by the electronic device, and the first user authentication information. The encryption key generation information is encrypted when the second user authentication information coincides with the first user authentication information and the first random number is not corrupted. Therefore, confidentiality of the encryption key generation information may further improve.

In order to improve confidentiality of the encryption key generation information, a second random number that is generated by the secured device may be used as well as the first user authentication information and the first random number that is generated by the electronic device.

The first random number, the second random number and the first user authentication information may be hashed before being used as a key.

The second random number that is generated by the secured device may be transmitted from the secured device to the electronic device. The second random number that is generated by the secured device may be encrypted based on a public key of the electronic device to be transmitted. The electronic device may obtain the second random number by using its secret key to decrypt the encrypted second random number.

The electronic device may encrypt, based on the first random number, the second random number obtained from the secured device, and the second user authentication information that are generated by the electronic device, encryption key generation information that is encrypted based on the first random number that is generated by the electronic device, the second random number that is generated by the secured device and the first user authentication information. The encryption key generation information is encrypted when the second user authentication information coincides with the first user authentication information, and the first random number and the second random number are not corrupted. Therefore, confidentiality of the encryption key generation information may further improve.

In an embodiment, a coded message may be encrypted based on the public key of the electronic device to be transmitted.

Authentication of an Electronic Device by Using Device Information

Device information may be referred to as information to identify a device. For example, the device information may include a media access control (MAC) address, an internet protocol (IP) address, a model number, and a serial number, but is not limited thereto.

In an embodiment, the electronic device may transmit its device information to the secured device. The device information of the electronic device may be transmitted with the second user authentication information that is generated by the electronic device. The device information and the second user authentication information may be decrypted together to be transmitted. For example, a combination of the device information and the second user authentication information may be encrypted.

When a coded message including the combination of the device information of the electronic device and the second user authentication information is transmitted to the secured device, a transmitter of the coded message may be configured to transmit its device information to the secured device. The secured device may compare the device information in the coded message with the device information of the transmitter to authenticate the electronic device. After authentication of the electronic device, the secured device may compare the second user authentication information in the coded message with the first user authentication information to authenticate a user.

In an embodiment, the device information of the electronic device, the first number that is generated by the electronic device, and the second user authentication information may be encrypted together. For example, a combination of the device information, the first random number and the second user authentication information may be encrypted.

In an embodiment, the secured device may transmit its device information to the electronic device. The device information of the secured device may be transmitted to the electronic device with the encryption key generation information. Here, the device information of the secured device and the second random number that is generated by the secured device may be encrypted together to be transmitted. For example, a combination of the device information of the secured device and the second random number may be encrypted together. The device information of the secured device and the encryption key generation information may be encrypted together. For example, a combination of the device of the secured device and the encryption key generation information may be encrypted.

When a coded message including the device information of the secured device is transmitted to the electronic device, a transmitter of the coded message may be configured to transmit its device information to the electronic device. The electronic device may compare the device information in the coded message with the device information of the transmitter to authenticate the secured device. After authentication of the secured device, the electronic device may generate an encryption key based on the encryption key generation information obtained from the coded message.

Figure 8:
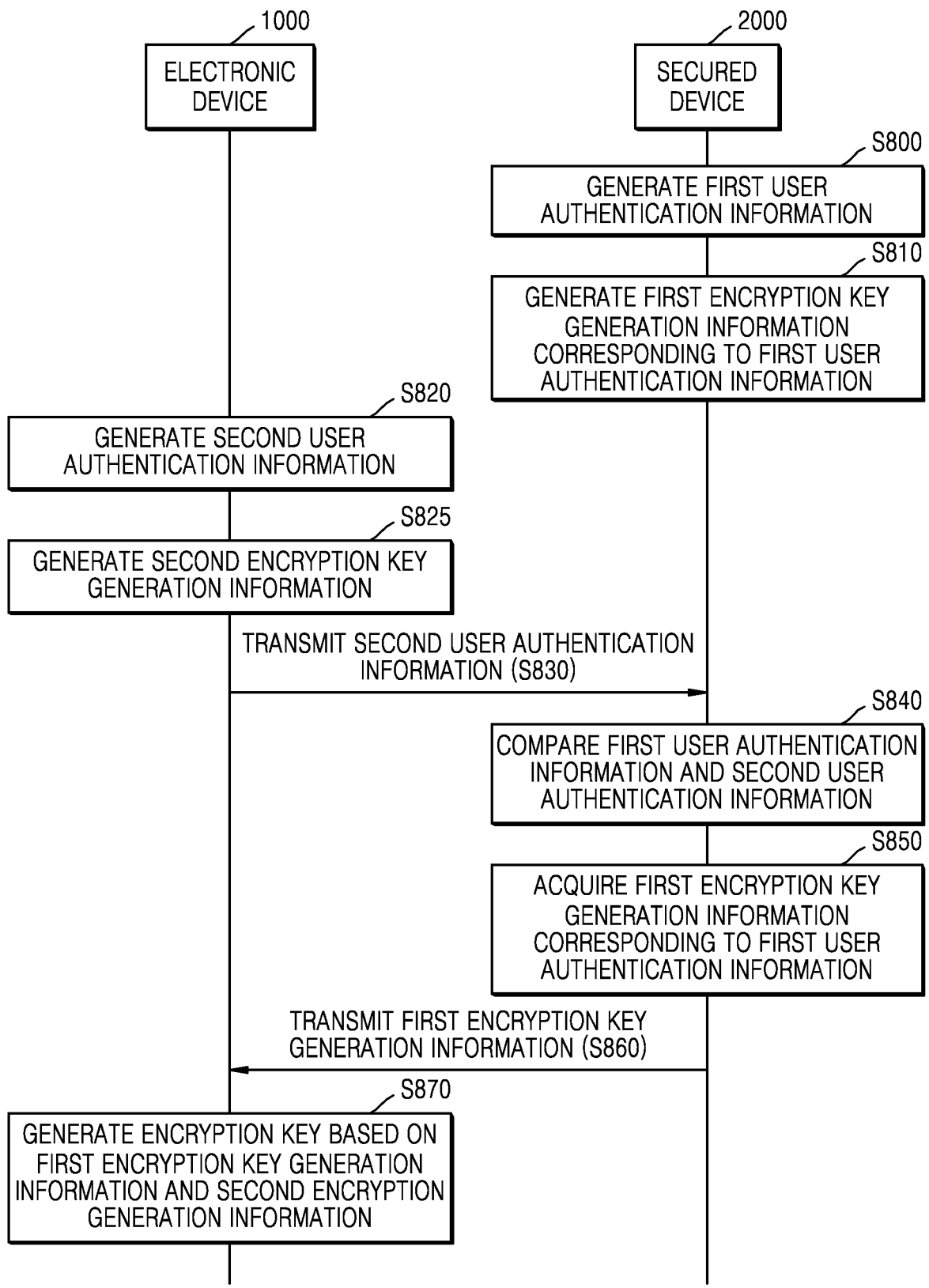
FIG. 8 illustrates a flowchart of a method of providing a security feature to an electronic device by using first encryption key generation information and second encryption key generation information according to an embodiment of the present disclosure.

Generation of an Encryption Key by Using First Encryption Key Generation Information and Second Encryption Key Generation Information FIG. 8 illustrates a flowchart of a method of providing a security feature to an electronic device by using first encryption key generation information and second encryption key generation information according to an embodiment of the present disclosure.

Operations S800, S810, S820, S830, S840, S850, S860, and S870 may respectively be substantially identical to operations S200, S210, S220, S230, S240, S250, S260, and S270. The encryption key generation information described above may be referred to as first encryption key generation information.

In operation S825, the electronic device may generate second encryption key generation information. The second encryption key generation information may be generated based on the second user authentication information that is generated by the electronic device.

The second encryption key generation information may be generated differently from the first encryption key generation information.

In operation S870, the electronic device may generate an encryption key based on the first encryption key generation information and the second encryption key generation information.

The first encryption key generation information and the second encryption key generation information may be removed from the electronic device after generation of the encryption key.

According to an embodiment, even either one of the first encryption key generation information and the second encryption key generation information is exposed, the encryption key may be secured safely.

Use of an Encryption Key at an Electronic Device

Information may be encrypted based on the generated encryption key, and the encryption key generation information may be removed from the electronic device based on a predetermined standard. The encrypted information may be stored in a memory of the electronic device. In order to access the stored encrypted information, the electronic device may receive the encryption key generation information from the secured device again to generate and use the encryption key.

The electronic device may set permission for a user based on the generated encryption key. In order to perform a function out of the permission at the electronic device, or to adjust the permission of the user, the electronic device may receive the encryption key generation information from the secured device again to generate and use the encryption key.

Figure 9:
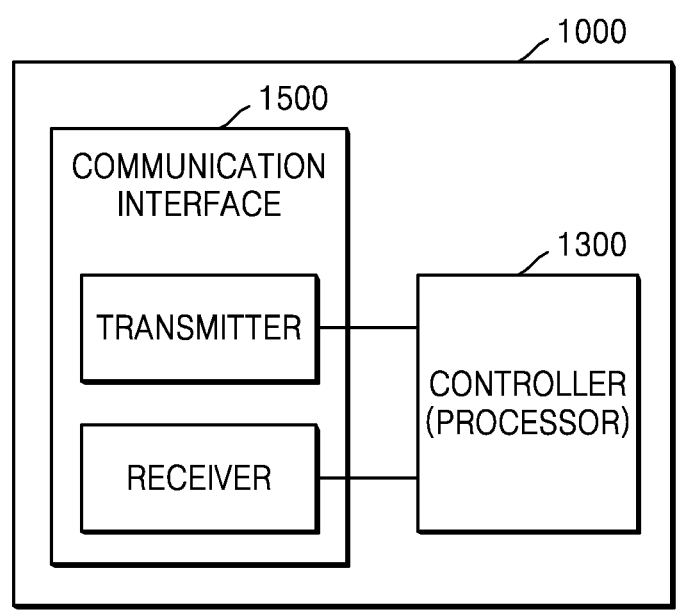
FIG. 9 illustrates an example electronic device according to an embodiment of the present disclosure.

FIG. 9 illustrates an example electronic device according to an embodiment of the present disclosure.

Figure 10:
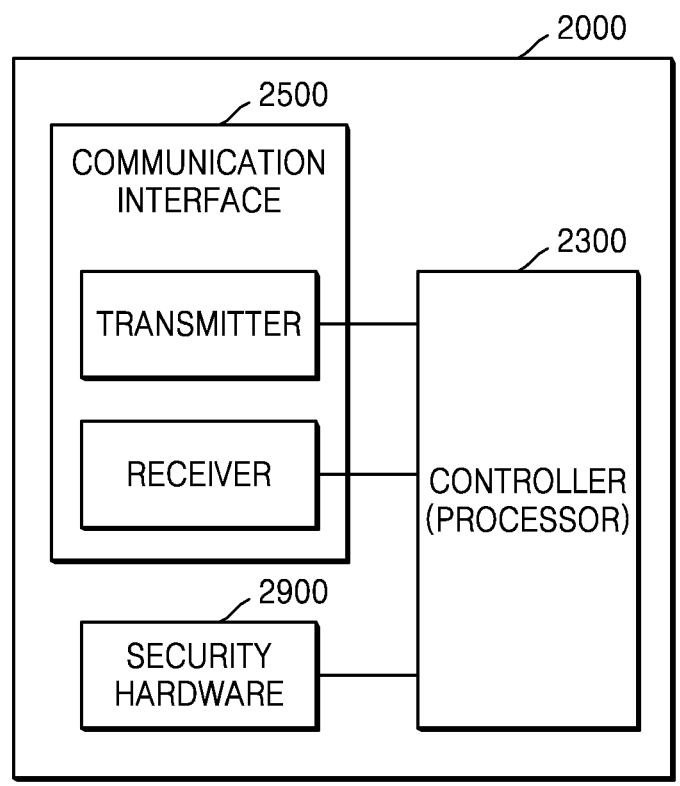
FIG. 10 illustrates an example secured device according to an embodiment of the present disclosure.

FIG. 10 illustrates an example secured device according to an embodiment of the present disclosure.

Referring to FIG. 9, an electronic device 1000 may include a controller 1300 comprising at least one processor, and a communication interface 1500. The communication interface 1500 may include a transmitter and a receiver, but is not limited thereto. For example, the communication interface 1500 may include a transceiver.

Referring to FIG. 10, a secured device 2000 may include a controller 2300 comprising at least one processor, a communication interface 2500, and a security hardware module 2900. The communication interface 2500 may include a transmitter and a receiver, but is not limited thereto. For example, the communication interface 1500 may include a transceiver.

The electronic device 1000 and the secured device 2000 may be printers, smartphones, tablets, personal digital assistants, media players, portable multimedia players, e-book readers, digital broadcast devices, personal computers, laptop computers, micro servers, navigations, MP3 players, digital cameras, but are not limited thereto.

A printer may perform various functions such as communication of information, setup, installation and use of applications, remote update as well as printing. A printer may function as a server for a plurality of devices connected to the printer through network. Described various methods may be used to improve security of a printer accessed by a plurality of devices.

The controller 1300 may control overall operations of the electronic device 1000, and may include at least one processor, a central processing unit (CPU), a micro processor, or a graphics processing unit (GPU), but is not limited thereto. The controller 1300 may include a plurality of modules, and each module may perform at least one function or at least one operation. The controller 2300 may control overall operations of the secured device 2000. Operations described herein may be performed by either one or both of the controller 1300 of the electronic device 1000 and the controller 2300 of the secured device 2000.

The communication interface 1500 of the electronic device 1000 may transmit information processed by the controller 1300 to the secured device 2000 and receive information from the secured device 2000. The communication interface 2500 of the secured device 2000 may transmit information processed by the controller 2300 to the electronic device 1000 and receive information from the electronic device 1000. Operations described herein may be performed by either one or both of the communication interface 1500 of the electronic device 1000 and the communication interface 2500 of the secured device 2000.

The secured device 2000 may further include the security hardware module 2900 in addition to components of the electronic device 1000. The security hardware module 2900 may be included in the secured device 2000 as a chip, may be mounted to the secured device 2000 and unmounted from the secured device 2000, or may be embodied as one of processors of the secured device 2000. For example, the security hardware module 2900 may be a TPM chip, a Smartcard, and a TrustZone, but is not limited thereto.

The controller 2300 of the secured device 2000 may generate the first user authentication information based on a user input. In an embodiment, the first user authentication information may be generated by the aid of the security hardware module 2900.

The generated first user authentication information may be stored in the memory 2700 of the secured device 2000, and compared with second user authentication information. Here, the second user authentication information may be referred to as user authentication information that is received at the electronic device to authenticate a user or a device. At least part of the first user authentication information may be hashed. When the first user authentication information includes first user identification information and first password information, the first password information may be hashed.

The memory 2700 of the secured device may store a plurality of pieces of first user authentication information for a plurality of users. In an embodiment, the first user authentication information may be stored in the security hardware module 2900 of the secured device 2000.

The controller 2300 of the secured device 2000 may generate encryption key generation information based on the generated first user authentication information. In an embodiment, the encryption key generation information may be generated by the aid of the security hardware module 2900.

The first user authentication information and encryption key generation information of a user may correspond to each other. In an embodiment, the first user authentication information of the user may correspond to a plurality of pieces of encryption key generation information.

The generated encryption key generation information may be stored in the memory 2700 of the secured device 2000. In an embodiment, the encryption key generation information may be stored in the security hardware module 2900 of the secured device 2000.

The controller 1300 of the electronic device 1000 may generate second user authentication information based on a user input.

The second user authentication information may include second password information and second user identification information, but is not limited thereto, and may include a biometric authentication information. At least part of the second user authentication information may be hashed. When the second user authentication information includes the second user identification information and the second password information, the second password information may be hashed.

The communication interface 1500 of the electronic device 1000 may transmit to the secured device 2000 the generated second user authentication information.

The electronic device 1000 may transmit to the secured device 2000 a coded message including the second user authentication information.

The secured device 2000 may compare the second user authentication information from the electronic device 1000 with the first user authentication information. In an embodiment, the first and second user authentication information may be compared with each other in the security hardware module 2900 of the secured device 2000.

When a plurality of pieces of the first user authentication information for a plurality of users are stored in the memory 2700 or the security hardware module 2900 of the secured device 2000, the secured device 2000 may retrieve a piece of the first user authentication information corresponding to the second user authentication information received from the electronic device 1000.

When the secured device 2000 fails to retrieve the first user authentication information corresponding to the second user authentication information, the secured device 2000 may transmit to the electronic device 1000 a message indicating that authentication has been failed.

The controller 2300 of the secured device 2000 may acquire encryption key generation information corresponding to the retrieved first user authentication information. In an embodiment, the encryption key generation information may be acquired by the aid of the security hardware module 2900.

In an embodiment, the piece of the first user authentication information (or the first user identification information) may correspond to a piece of encryption key generation information. In an embodiment, the piece of the first user authentication information (or the first user identification information) may correspond to a plurality of pieces of encryption key generation information.

The security hardware module 2900 of the secured device 2000 may encrypt the encryption key generation information by using the first user authentication information as an encryption key. The encryption key generation information may be encrypted based on a part of the first user authentication information. When the first user authentication information includes first user identification information and first password information, the first password information may be used to encrypt the encryption key generation information.

The communication interface 2500 of the secured device 2000 may transmit to the electronic device 1000 the acquired encryption key generation information.

The communication interface 2500 of the secured device 2000 may transmit to the electronic device 1000 a coded message including the acquired encryption key generation information.

The controller 1300 of the electronic device 1000 may generate an encryption key based on the encryption key generation information transmitted from the secured device 2000.

In an embodiment, when the encryption key generation information is encrypted based on the first user authentication information, the controller 1300 of the electronic device 1000 may decrypt the encrypted encryption key generation information based on the second user authentication information.

According to an embodiment, the electronic device 1000, even not including a security hardware module, may be provided with higher security as the secured device 2000.

According to an embodiment, encryption key generation information is communicated between the secured device 2000 and the electronic device 1000 and the electronic device 1000 uses an encryption key temporarily generated based on the encryption key generation information, thus, exposure of an encryption key may be suppressed.

Figure 11:
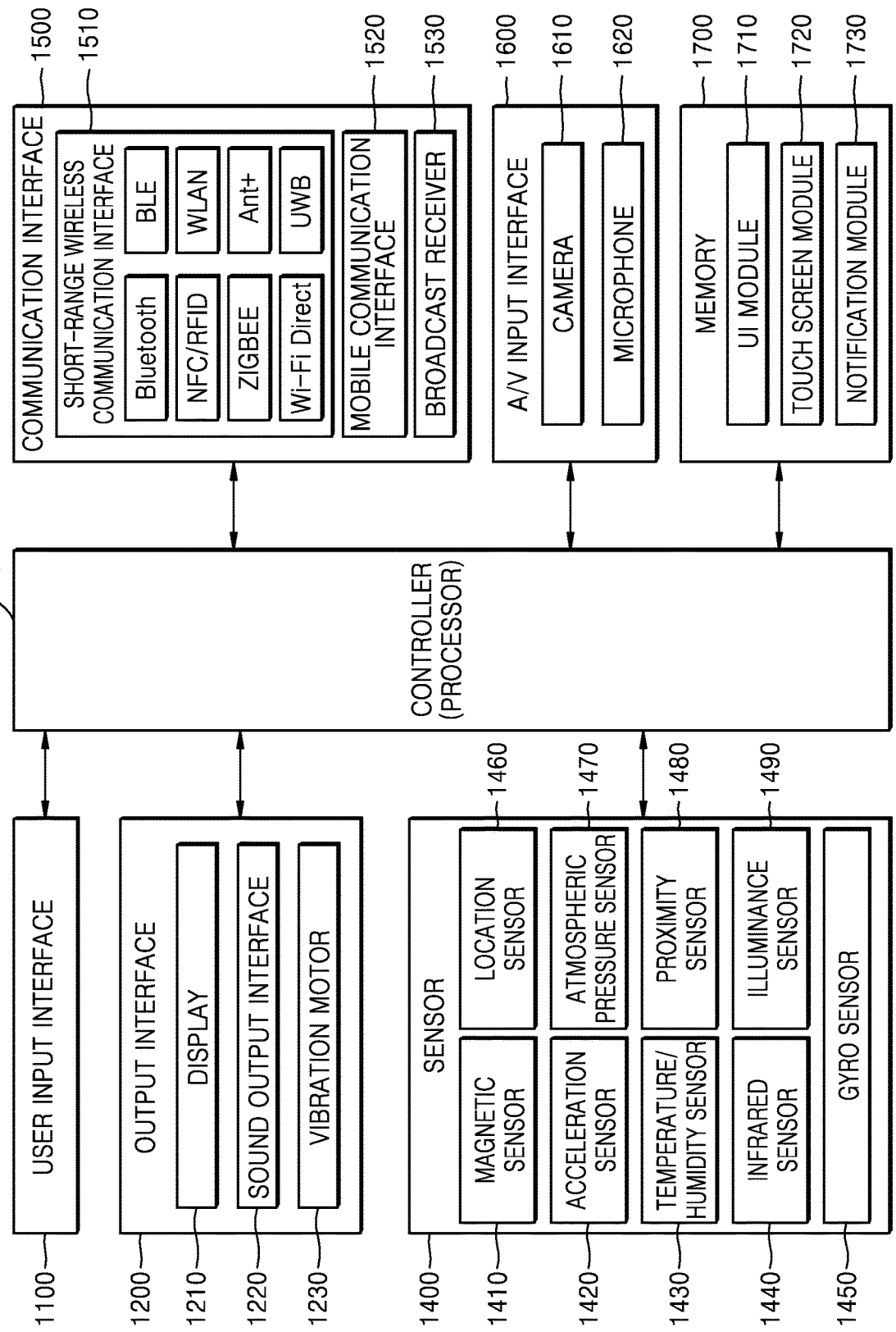
FIG. 11 illustrates another example electronic device according to an embodiment of the present disclosure.

FIG. 11 illustrates another example electronic device according to an embodiment of the present disclosure.

However, all the components shown in FIG. 11 are not essential components of the electronic device 1000. The electronic device 1000 may be embodied by more or less components than shown in FIG. 11. For example, as illustrated FIG. 11, the electronic device 1000 may further include a user input interface 1100, an output interface 1200, a controller 1300, a sensor 1400, a communication interface 1500, an A/V input interface 1600, and a memory 1700.

Details of each component of the electronic device 1000 is described below.

The user input interface 1100 may be used for a user to input data to the electronic device 1000. The user input interface 1100 may include a key pad, a dome switch, a touch pad, a jog wheel, a jog switch, a button, etc.

A button may be located on the front, the back, and the sides of the electronic device 1000. For example, the button may be a home button, a menu button, and a return button located on a lower part of the front of the electronic device 1000, but is not limited thereto. The button may be a lock button and a volume button located on the side of the electronic device 1000, but is not limited thereto.

The button may be embodied as a touch button located on a bezel of a touch screen. When the electronic device is embodied as a smartwatch, the button may be embodied as a crown of the smartwatch.

The touch pad may be embodied as a capacitive type, a resistive type, an infrared sensing type, a surface acoustic wave propagation type, integral strain gauge type, piezo-effect type, and electromagnetic resonance type, but is not limited thereto. The touch pad may construct a layer structure with the display 1210, or may be directly located on the display 1210, thereby functioning as a touch screen.

The touch pad may detect a proximity touch as well as a real-touch, both of which may be referred to as a touch.

The real touch may be made by bringing a pointer into contact with the touch pad, and the proximity touch may be made by bring the pointer closer to the touch pad.

The pointer denotes a touch instrument for the real touch or the proximity touch. For example, the pointer may be a stylus pen, a finger, etc.

The electronic device 1000 may further include a tactile sensor or a pressure detecting sensor for more precise sensing. The tactile sensor may detect various information such as a roughness of a contact surface, hardness of a contacting object, and a temperature at a contact point.

Pressure of touch may be sensed by the pressure detecting sensor. Different functions may be performed based on the pressure of touch.

Different functions may be performed based on gesture inputs. For example, the gesture inputs may include a tab input, a double tap input, a multiple tap input, a long tab input, a long tab input, a drag input, a swipe input, a pinch-out input, a pinch-in input, etc.

Key inputs may be received by a keypad. For example, the keypad may be a virtual keypad displayed on a touch screen, a physical keypad.

The output interface 1200 may be used for outputting an audio signal, a video signal, or a vibration signal, and may include a display 1210, a sound output interface 1220, and a vibration motor 1230.

The display 1210 may include a plurality of pixels, and display information processed by the electronic device 1000. For example, a screen of an operating system, a screen of an application system executed in the operating system may be displayed on the display 1210. The controller 1300 may control display of a graphical user interface (GUI) corresponding to various functions such as voice call, video call, data transmission, broadcasting reception, photographing, video play, application execution, etc.

Video data may be displayed on the display 1210. Video data may be played by using a video codec. The video codec may be a hardware codec, a software codec, or a combination thereof.

The display 1210 may include at least one from among a liquid crystal display, a thin-film transistor-liquid crystal display, an organic light-emitting diode, a flexible display, a three dimensional (3D) display, an electrophoretic display, and a vacuum fluorescent display.

The electronic device 1000 may include two or more display. The two or more displays may be disposed to face each other across a hinge.

The sound output interface 1220 may output audio data received from the communication interface 1500 or stored in the memory 1700. For example, the sound output interface 1220 may be a speaker, and audio data may be played by using an audio codec. The audio codec may be a hardware codec, a software codec, or a combination thereof.

The sound output interface 1220 may output a sound signal (e.g., a touch sound corresponding to a key touched or pushed) corresponding to one or more functions performed by the electronic device 1000.

The sound output interface 1220 may be located on the front, the back, or the sides of the electronic device 1000, and may be embodied as a plurality of speakers.

The vibration motor 1230 may convert an electrical signal into a mechanical vibration. The vibration motor 1230 may include a linear vibration motor, a bar type vibration motor, a coin type vibration motor, or a piezoelectric vibration motor. The vibration motor 1230 may generate a vibration corresponding to an output of audio data or video data. The vibration motor 1230 may vibrate the electronic device 1000, or a part of the electronic device 1000. The electronic device 1000 may include two or more vibration motors.

The controller may perform various functions of the electronic device 1000 by controlling overall operations of the electronic device 1000. For example, the controller 1300 may execute programs stored in the memory 1700 to control the user input interface 1100, the output interface 1200, the sensor 1400, the communication interface 1500, and the A/V input interface, etc.

The controller 1300 may include a processor. The electronic device 1000 may include a read-only memory (ROM) storing a computer program executable by the controller 1300. The electronic device 1000 may include a random access memory (RAM) that is used as a storage for various operation s performed by the electronic device 1000.

The electronic device 1000 may further include a GPU for a graphic processing. The processor may be embodied as a system-on chip (SoC) including a core and the GPU. The processor may be a single core processor, a dual core processor, a triple core processor, a quad core processor, or a multiple core processor. The processor, ROM, and RAM may be connected to each other by a bus.

The sensor 1400 may include at least one sensor for detecting a state of the electronic device 1000. For example, the sensor 1400 may include a proximity sensor 1480 for detecting an object approaching to the electronic device 1000, an illuminance sensor 1490 for detecting the amount of ambient light, and a gyro sensor 1450 for measuring an angular speed with respect to each of an X, Y, and Z axes, but is not limited thereto.

The sensor 1400 may include a location sensor 1460 such as a global positioning system (GPS) for detecting a location of the electronic device 1000. In an outdoor place, a location of the electronic device 1000 may be calculated by the GPS.

In an indoor place, the location of the electronic device 1000 may be calculated by using a wireless access point (AP). In the indoor place, the location of the electronic device 1000 may be calculated by a cell-identifier (cell-ID) method using an identifier of the AP, an enhanced cell-ID method further using received signal strength (RSS), or an angle of arrival (AoA) method using an angle at which a signal transmitted from the AP. In the indoor place, the location of the electronic device 1000 may be calculated by using a wireless beacon.

The sensor 1400 may include a magnetic sensor 1410 for detecting azimuth based on the earth magnetic field, an acceleration sensor 1420 for detecting an angular speed with respect to each of X, Y, and Z axes, a gravity sensor for detecting a direction of the gravity, an illuminance sensor 1490 such as a red, green, blue (RGB) sensor for measuring a concentration of red, green, blue, and white (RGBW) lights, a hall sensor for sensing a magnetic field, a magnetometer for measuring an intensity of a magnetic field, an infrared (IR) sensor 1440 for detecting an object based on IR light, an atmospheric pressure sensor 1470 such as an altimeter for measuring a gradient and atmospheric pressure to measure a height, a fingerprint sensor, a heart rate sensor, a pressure sensor, an ultraviolet (UV) sensor, a temperature humidity sensor 1430, and a motion sensor, but is not limited thereto. A function of each sensor would be intuitively inferred by those of ordinary skill in the art, and detailed explanation thereof is omitted in this disclosure.

The electronic device 1000 may communicate with other devices through the communication interface 1500. The communication interface 1500 may include at least one element for establishing communication with other devices. For example, the communication interface 1500 may include a short-range communication interface 1510, a mobile communication interface 1520, and a broadcast receiver 1530.

The short-range communication interface 1510 may include a BLUETOOTH communication interface, a BLUETOOTH lower energy (BLE) communication interface, a near field communication (NFC) communication interface, a radio frequency identification (RFID) communication interface, a Wi-Fi communication interface, a ZigBee communication interface, an infrared data association (IrDA) communication interface, a Wi-Fi direct (WFD) communication interface, an ultra wideband (UWB) communication interface, an Ant+communication interface, and a Z-wave communication interface, but is not limited thereto.

The mobile communication interface 1520 may communicate a radio signal with at least one from among a base station, an external terminal, and a server via a mobile communication networks. The mobile communication interface 1520 may communicate the radio signal, which is used for a voice call, a video call, a short message service (SMS), a multimedia message service (MMS), with other devices having a phone number. Here, the radio signal may be a voice call signal, a video call signal, or data in any one of various formats according to transmission and reception of a text/multimedia message.

The broadcast receiver 1530 may receive a broadcasting signal such as a television broadcasting signal, a radio broadcasting signal, or a data broadcasting signal. The broadcast receiver 1530 may receive a broadcast-related information such as electronic program guide and electronic service guide. The controller 1300 may play the received broadcast signal and broadcast-related information by using a video codec and audio codec. The broadcast signal and the broadcast-related information may be received through a broadcasting channel The broadcasting channel may include a satellite channel, a terrestrial channel, etc. The electronic device 1000 may not include the broadcast receiver 1530 according to embodiments.

The A/V input interface 1600 may include a camera 1610 and a microphone 1620 to receive an audio signal or a video signal.

A still image or a video may be photographed by the camera 1610. The camera 1610 may obtain an image frame of the still image or the video by using an image sensor. The image frame photographed by the image sensor may be processed by the controller 1300 or a separate image processor. Images captured by the camera 1610 may be stored in the memory 1700, or transmitted to other devices through the communication interface 1500.

The camera 1610 may include a first camera and a second camera which are located at different positions of the electronic device 1000. For example, the first camera may be located on the front of the electronic device 1000, and the second camera may be located on the back of the electronic device 1000. For example, the first and second cameras may be located adjacent to each other on the same side of the electronic device 1000. When the first and second cameras are located adjacent to each other on the same side, a 3D image or a 3D video may be captured by the first and second cameras. The camera 1610 may further include more cameras in addition to the first and second cameras.

The camera 1610 may further include a flashlight. The camera 1610 may further include an additional detachable lens for wide angle photograph, telephoto photograph, or a close-up photograph.

An electrical signal may be generated based on an acoustic signal from the outside through the microphone 1620.

The electrical signal may be converted by an audio codec to be stored in memory 1700 or output through the sound output interface 1220. The microphone 1620 may be located on the front, the back, or the sides of the electronic device 1000. Various noise-reduction algorithms may be used to reduce noise occurring while receiving the acoustic signal from the outside.

Memory 1700 may store various types of data and programs for controlling the electronic device 1000 according to control by the controller 1300. For example, the memory 1700 may store data for a GUI associated with programs or applications, user information, documents, databases, and relevant data, but is not limited thereto.

The memory 1700 may include a non-volatile memory, a volatile memory, a hard disk drive (HDD), a solid state drive (SSD), etc. The memory may be referred to as a storage.

Programs stored in the memory 1700 may be classified into a plurality of modules. For example, the plurality of modules may be a user interface (UI) module 1710, a touch screen module 1720, and a notification module 1730, but are not limited thereto.

The UI module 1710 may provide a UI or a GUI according to each program or application to interact with the electronic device 1000. The touch screen module 1720 may detect a user's touch gesture on a touch screen and transmit information regarding the touch gesture to the controller 1300. The notification module 1730 may generate a signal for notifying an occurrence of an event at the electronic device 1000. The notification module 1730 may output a notification signal through the display 1210 in the form of a video, through the sound output interface 1220 in the form of an audio, and through the vibration motor 1230 in the form of a vibration.

A connector may be used to connect the electronic device 1000 with a power source. Data may be communicated through a cable connected to the connector with the other devices. Power may be applied to the electronic device 1000 through a cable connected to the connector, and a battery of the electronic device 1000 may be charged. The electronic device 1000 may be connected to an external accessory such as a speaker and a keyboard dock.

Figure 12:
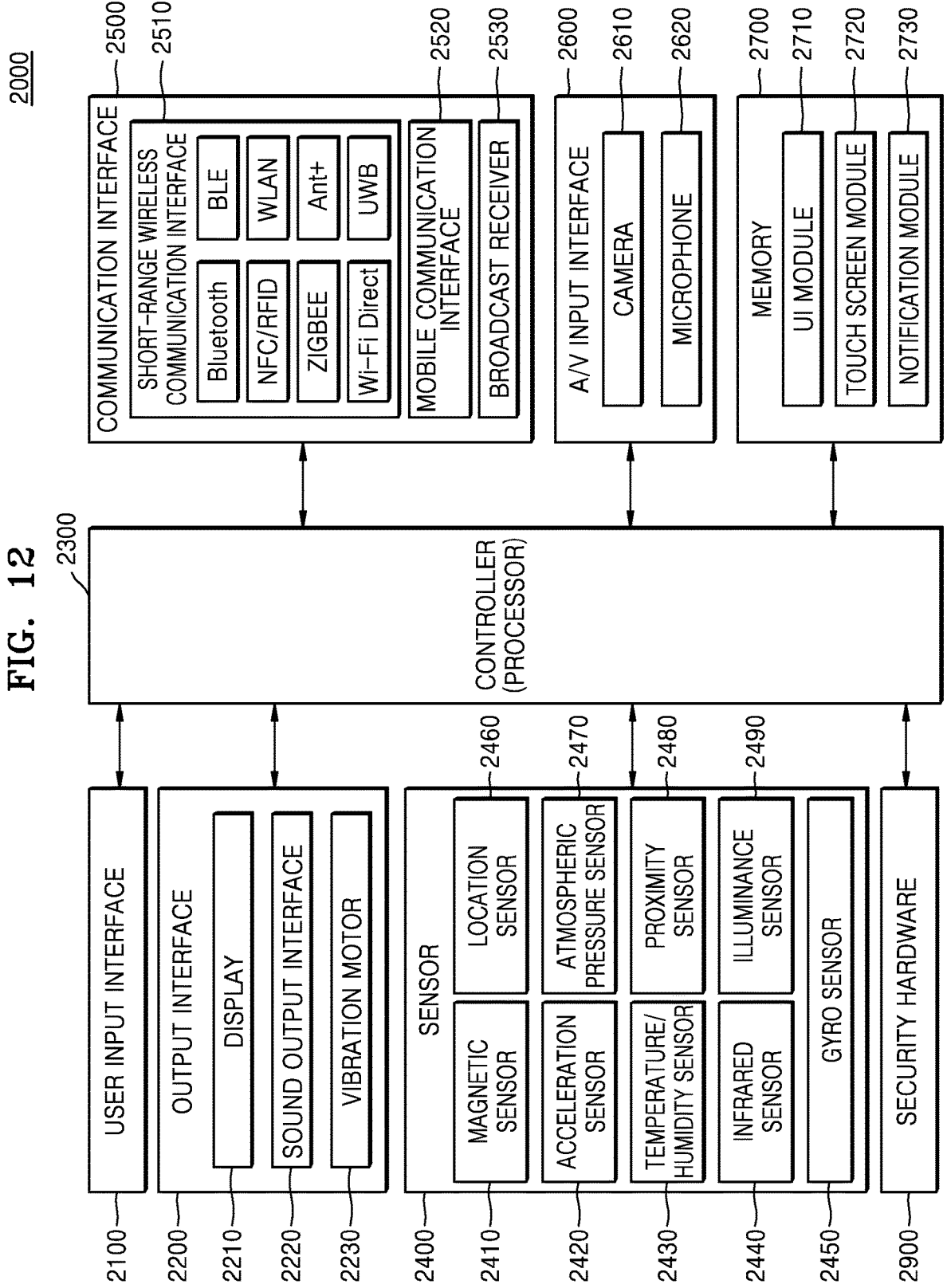
FIG. 12 illustrates another example secured device according to an embodiment of the present disclosure.

FIG. 12 illustrates another example secured device according to an embodiment of the present disclosure.

However, all the components shown in FIG. 12 are not essential components of the secured device 2000. The secured device 2000 may be embodied by more or less components than shown in FIG. 12. For example, as illustrated FIG. 12, the secured device 2000 may further include a user input interface 2100, an output interface 2200, a controller 2300, a sensor 2400, a communication interface 2500, an A/V input interface 2600, a memory 2700, and a security hardware module 2900.

Components of the secured device 2000 may have the substantially same functions with components of the electronic device 1000. For example, display 2210, sound output interface 2220, vibration motor 2230, magnetic sensor 2410, acceleration sensor 2420, temperature/humidity sensor 2430, infrared sensor 2440, gyro sensor 2450, location sensor 2460, atmospheric pressure sensor 2470, proximity sensor 2480, illuminance sensor 2490, short-range wireless communication interface 2510, mobile communication interface 2520, broadcast receiver 2530, camera 2610, microphone 2620, UI module 2710, touch screen module 2720, and notification module 2730 are essentially similar to the corresponding elements depicted in FIG. 11, and a description thereof is omitted here for brevity.

The secured device 2000 may further include the security hardware module 2900 in addition to components of the electronic device 1000. The security hardware module 2900 may be included in the secured device 2000 as a chip, may be mounted to the secured device 2000 and unmounted from the secured device 2000, or may be embodied as one of processors of the secured device 2000. For example, the security hardware module 2900 may be a TPM chip, a Smartcard, and a TrustZone, but is not limited thereto.

All references including publications, patent applications, and patents, cited herein, are hereby incorporated by reference to the same extent as if each reference were individually and specifically indicated to be incorporated by reference and were set forth in its entirety herein.

The embodiments are examples and are not to be construed as limiting, and the description of the embodiments is intended to be illustrative, and not to limit the scope of the claims, and many alternatives, modification, and variations will be apparent to those skilled in the art.

The embodiments may be represented using functional block components and various operations. Such functional blocks may be realized by any number of hardware and/or software components configured to perform specified functions. For example, the embodiments may employ various integrated circuit components, e.g., memory, processing elements, logic elements, look-up tables, and the like, which may carry out a variety of functions under control of at least one microprocessor or other control devices. As the elements of the embodiments are implemented using software programming or software elements, the embodiments may be implemented with any programming or scripting language such as C, C++, Java, assembler, or the like, including various algorithms that are any combination of data structures, processes, routines or other programming elements. Functional aspects may be realized as an algorithm executed by at least one processor. Furthermore, the embodiments concept may employ related techniques for electronics configuration, signal processing and/or data processing. The terms 'mechanism', 'element', 'means', 'configuration', etc. are used broadly and are not limited to mechanical or physical embodiments. These terms should be understood as including software routines in conjunction with processors, etc.

The particular implementations shown and described herein are embodiments and are not intended to otherwise limit the embodiments in any way. For the sake of brevity, related electronics, control systems, software development and other functional aspects of the systems may not be described in detail. Furthermore, the lines or connecting elements shown in the appended drawings are intended to represent functional relationships and/or physical or logical couplings between the various elements. It should be noted that many alternative or additional functional relationships, physical connections or logical connections may be present in a practical device. Moreover, no item or component is essential to the practice of the embodiments unless it is specifically described as "essential" or "critical."

The use of the terms "a", "an", and "the" and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The operations of all methods described herein can be performed in an appropriate order unless otherwise indicated herein or otherwise clearly contradicted by context. The embodiments are not limited by an order in which the operations are described herein. The use of any and all examples, or language (e.g., "such as") provided herein, is intended merely to clearly describe the embodiments and does not pose a limitation on the embodiments unless otherwise claimed. Numerous modifications and adaptations will be readily apparent to those skilled in this art without departing from the spirit and scope of the embodiments.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method comprising:
   generating, at a secured device comprising a security hardware module, first user authentication information of a first user based on a user input;
   generating, at the secured device, encryption key generation information corresponding to the first user authentication information of the first user;
   receiving, at the secured device, encrypted second user authentication information of the first user from an electronic device;
   decrypting, at the secured device, the received second user authentication information of the first user;
   acquiring the encryption key generation information corresponding to the first user authentication information of the first user when the decrypted second user authentication information of the first user matches the first user authentication information of the first user;
   encrypting, at the secured device, the encryption key generation information; and
   transmitting, from the secured device, the encrypted encryption key generation information to the electronic device,
   wherein the first user authentication information of the first user and the encryption key generation information are secured by the security hardware module of the secured device,
   wherein the transmitted encrypted encryption key generation information is decrypted at the electronic device, and
   wherein the decrypted encryption key generation information is used to generate an encryption key.

2. The method of claim 1, further comprising:
   receiving, at the secured device, a random number generated and transmitted by the electronic device; and
   encrypting, at the secured device, the encryption key generation information based on the received random number.

3. The method of claim 1, further comprising:
   encrypting, at the secured device, the encryption key generation information based on the first user authentication information of the first user.

4. The method of claim 1, wherein the method further comprises:
   receiving, at the secured device, device information of the electronic device from the electronic device; and
   authenticating, at the secured device, the electronic device based on the received device information of the electronic device,
   wherein the receiving of the second user authentication information of the first user comprises receiving the second user authentication information of the first user from the authenticated electronic device.

5. The method of claim 1, further comprising:
   transmitting device information of the secured device from the secured device to the electronic device to authenticate the secured device at the electronic device.

6. The method of claim 1, wherein information is stored based on the generated encryption key.

7. The method of claim 1, wherein permission for a user is set based on the generated encryption key.

8. The method of claim 1, wherein the generated encryption key is removed based on a predetermined standard.

9. The method of claim 1, wherein the second user authentication information of the first user and the encryption key generation information are removed after the encryption key is generated.

10. The method of claim 1, wherein the encryption key generation information is first encryption key generation information, and
    wherein second encryption key generation information generated by the electronic device is further used to generate the encryption key.

11. The method of claim 1, wherein second encryption key generation information is generated based on the second user authentication information of the first user.

12. The method of claim 1, wherein the encryption key generation information is encrypted based on a public key of the electronic device.

13. A non-transitory computer-readable storage medium comprising instructions, which, when executed, cause a secured device comprising a security hardware module to:
    generate first user authentication information of a first user based on a user input;
    generate encryption key generation information corresponding to the first user authentication information of the first user;
    receive encrypted second user authentication information of the first user from an electronic device;
    decrypt the received second user authentication information of the first user;
    acquire the encryption key generation information corresponding to the first user authentication information of the first user when the decrypted second user authentication information of the first user matches the first user authentication information of the first user;
    encrypt the encryption key generation information; and
    transmit the encrypted encryption key generation information to the electronic device
    wherein the first user authentication information of the first user and the encryption key generation information are secured by the security hardware module of the secured device,
    wherein the transmitted encrypted encryption key generation information is decrypted at the electronic device, and
    wherein the decrypted encryption key generation information is used to generate an encryption key.

14. The non-transitory computer-readable storage medium of claim 13, wherein the instructions further cause the secured device to:
    receive a random number generated and transmitted by the electronic device; and
    encrypt the encryption key generation information based on the received random number.

15. The non-transitory computer-readable storage medium of claim 13, wherein the instructions further cause the secured device to:
  encrypt the encryption key generation information based on the first user authentication information of the first user.

16. The non-transitory computer-readable storage medium of claim 13, wherein the instructions further cause the secured device to:
  receive device information of the electronic device from the electronic device; and
  authenticate the electronic device based on the received device information of the electronic device.

17. The non-transitory computer-readable storage medium of claim 13, wherein the encryption key generation information is first encryption key generation information, and
  wherein second encryption key generation information generated by the electronic device is further used to generate the encryption key.

18. The non-transitory computer-readable storage medium of claim 13, wherein the encryption key generation information is encrypted based on a public key of the electronic device.

19. A device comprising:
  a security hardware module;
  a memory storing instructions; and
  a processor to execute the instructions to:
    generate first user authentication information of a first user based on a user input,
    generate encryption key generation information corresponding to the first user authentication information of the first user,
    receive encrypted second user authentication information of the first user from an electronic device,
    decrypt the received second user authentication information of the first user,
    acquire the encryption key generation information corresponding to the first user authentication information of the first user when the second user authentication information of the first user matches the first user authentication information of the first user,
    encrypt the encryption key generation information, and
    transmit the encrypted encryption key generation information to the electronic device,
  wherein the first user authentication information of the first user and the encryption key generation information are secured by the security hardware module,
  wherein the transmitted encrypted encryption key generation information is decrypted at the electronic device, and
  wherein the decrypted encryption key generation information is used to generate an encryption key.

* * * * *